Patented Dec. 3, 1946

2,411,982

UNITED STATES PATENT OFFICE 2,411,982

PROCESS FOR MAKING POLYHALOGENATED STRAIGHT-CHAIN ALIPHATIC CARBOXYLIC ACID HALIDES

Clement W. Theobald, Christiana Hundred, Del., assignor to E. I. du Pont de Nemours & Company, Wilmington, Del., a corporation of Delaware No Drawing. Application November 28, 1944, Serial No. 565,571

5 Claims. (Cl. 260—544)

This invention relates to the preparation of polyhaloacyl halides and more particularly to the preparation of polychloropropanoyl and polychloropropenoyl chlorides. While there has long been a need for a practicable method for producing polyhaloacyl halides and particularly polychloropropanoyl and polychloropropenoyl chlorides from low-cost materials, no such process has hitherto been known.

Accordingly this invention has as an object the provision of a practicable process for obtaining polyhalogenated, straight-chain, aliphatic carboxylic acid halides containing three carbon atoms. A further object is the practicable production of said halides from low-cost materials. A still further object is the practicable production of polychlorinated straight-chain, aliphatic carboxylic acid chlorides containing three carbon atoms from low-cost materials. Still further objects are the economical and practicable preparation of polychloropropanoyl and polychloropropenoyl chlorides. Additional objects will become apparent from an examination of the following description and claims.

These and other objects and advantages are accomplished according to the herein described invention which broadly comprises heating, under superatmospheric pressure and at a temperature within the range of from 50° C. to 250° C., a substantially anhydrous mixture comprising carbon monoxide and a polyhalogenated ethane which contains from 3 to 5 halogen atoms, in the presence of a halide of a polyvalent inorganic element, said halide being a Friedel-Crafts catalyst.

A preferred embodiment of this invention comprises heating, at a temperature within the range of from 70° C. to 200° C. and under a pressure within the range of from 50 atms. to 1000 atms., and in the presence of aluminum chloride, a substantially anhydrous mixture comprising carbon monoxide and a polychlorinated ethane containing from 3 to 5 chlorine atoms.

The following examples, in which proportions are in parts by weight unless otherwise specified, are given for illustrative purposes and are not intended to place any restrictions on the herein described invention.

Example I

Pentachloroethane (250 parts) and 50 parts of anhydrous aluminum chloride are placed in a silver-lined high pressure reactor; carbon monoxide is added to a pressure of 250 atm. The reactor is then agitated and heated to 125° C. and additional carbon monoxide is added to bring the pressure up to 950 atm. Under these conditions the tube is heated for eight hours. During this time, additional carbon monoxide is added to maintain a pressure of 950 atm. The reactor is then cooled to room temperature and the pressure slowly released. The volatile materials are removed from the catalyst under reduced pressure at room temperature. Fractionation of the product yields 26 parts of tetrachloropropionyl chloride, 50 parts of tetrachloroethylene, and 70 parts of unreacted pentachloroethane. The tetrachloropropionyl chloride is identified by its boiling point (85–89° C./35 mm.) and by its chlorine analysis (76.52% Cl, theory, 76.93%) and by the analysis of the anilide (49.8% Cl, calc'd 49.4% Cl).

Example II

As in Example I, 200 parts of beta-trichloroethane and 20 parts of aluminum chloride are reacted with carbon monoxide under 950 atm. pressure at 100° C. for eight hours. Ten parts of dichloropropionyl chloride is obtained. Most of the unreacted trichloroethane is recovered. The dichloropropionyl chloride was identified by the preparation of its anilide. Analysis: 32.6% Cl, theory, 32.45% Cl.

Example III

As in Example I, 200 parts of symmetrical tetrachloroethane and 20 parts of aluminum chloride are reacted with carbon monoxide under 950 atm. pressure at 150° C. for eight hours. Four parts of dichloroacrylyl chloride is obtained which was identified by the preparation and analysis of its anilide, Found: 33.17% Cl, 6.53% N; theory, 32.8% Cl, 6.48% N. Small amounts of trichloropropionyl chloride are also isolated. Most of the unreacted tetrachloroethane is recovered.

While this invention has been illustrated with particular reference to the provision of chlorinated acylchlorides from chlorinated ethanes containing from 3 to 5 chlorine atoms in the molecule, it is to be understood that this invention is broadly applicable to the production of polyhalogenated, straight-chain aliphatic carboxylic acid halides of three carbon atoms by the reaction of carbon monoxide with any halogenated ethane containing from 3 to 5 halogen atoms. Included among examples of said halogenated ethanes contemplated as operative in the process of the instant invention are pentachloroethane, beta-trichloroethane, symmetrical tetrachloroethane, and the fluoro and bromo analogs thereof.

Catalysts which are useful in the reaction between carbon monoxide and the polyhalogenated ethanes are those which are halides of polyvalent inorganic elements and which are applicable to the well-known Friedel-Crafts condensation. Included among examples of said catalysts are aluminum chloride, aluminum bromide, aluminum fluoride, ferric chloride, zinc chloride, titanium chloride and boron trifluoride.

Appreciable effects are had when the temperature employed in my novel process is as low as 50° C. and when it is as high as 250° C. However, temperatures without said range are to be avoided since polyhalogenated, straight-chain aliphatic carboxylic acid halides containing three carbon atoms are not obtained at temperatures which are substantially outside of said range. Optimum yields of said acid halides are obtained when the temperature employed is within the range of from 70° C. to 200° C. This invention is operable over a wide range of superatmospheric pressures although, in general, I prefer to operate at a pressure within the range of from 50 atms. to 1000 atms. on account of the superior yields obtained thereby.

The polyhalogenated acyl halides obtainable by this invention are readily convertible to the corresponding acids and other simple derivatives by reactions well-known in the art. In the form of these derivatives the products of this invention are useful as pesticides, rubber chemicals, dye intermediates, medicinals, and as specialty acids in the leather, metal and electroplating arts.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. The process for obtaining a polychlorinated straight-chain, aliphatic carboxylic acid halide, which comprises heating a substantially anhydrous mixture comprising carbon monoxide and a polychlorinated ethane which contains from 3 to 5 chlorine atoms, said heating being effected under superatmospheric pressure at a temperature within the range of from 50° C. to 250° C. in the presence of a halide of a polyvalent inorganic element, said halide being a Friedel-Crafts catalyst.

2. The process for obtaining a polychlorinated, straight-chain, aliphatic carboxylic acid chloride containing three carbon atoms, which comprises heating a substantially anhydrous mixture comprising carbon monoxide and a polychlorinated ethane containing from 3 to 5 chlorine atoms, said heating being effected under a pressure within the range of from 50 atmospheres to 1000 atmospheres at a temperature within the range of from 70° C. to 200° C. in the presence of a polyvalent metal halide which is a Friedel-Crafts catalyst.

3. The process for obtaining tetrachloropropionyl chloride which comprises heating carbon monoxide with pentachloroethane under a pressure within the range of from 50 atmospheres to 1000 atmospheres at a temperature within the range of from 70° C. to 200° C. under substantially anhydrous conditions in the presence of aluminum chloride.

4. The process for obtaining dichloropropionyl chloride which comprises heating carbon monoxide with beta-trichloroethane under a pressure within the range of from 50 atmospheres to 1000 atmospheres at a temperature within the range of from 70° C. to 200° C. under substantially anhydrous conditions in the presence of aluminum chloride.

5. The process for obtaining dichloroacrylyl chloride which comprises heating carbon monoxide with symmetrical tetrachloroethane under a pressure within the range of from 50 atmospheres to 1000 atmospheres at a temperature within the range of from 70° C. to 200° C. under substantially anhydrous conditions in the presence of aluminum chloride.

CLEMENT W. THEOBALD.